(12) United States Patent
Kim et al.

(10) Patent No.: US 12,075,838 B2
(45) Date of Patent: Sep. 3, 2024

(54) AEROSOL-GENERATING DEVICE AUTOMATICALLY PERFORMING HEATING OPERATION

(71) Applicant: KT&G CORPORATION, Daejeon (KR)

(72) Inventors: Yong Hwan Kim, Anyang-si (KR); Dae Nam Han, Seoul (KR); Sung Wook Yoon, Suwon-si (KR); Seung Won Lee, Gwangmyeong-si (KR)

(73) Assignee: KT&G CORPORATION, Daejeon (KR)

( * ) Notice: Subject to any disclaimer, the term of this patent is extended or adjusted under 35 U.S.C. 154(b) by 734 days.

(21) Appl. No.: 17/269,171

(22) PCT Filed: Dec. 10, 2020

(86) PCT No.: PCT/KR2020/018104
§ 371 (c)(1),
(2) Date: Feb. 17, 2021

(87) PCT Pub. No.: WO2021/145564
PCT Pub. Date: Jul. 22, 2021

(65) Prior Publication Data
US 2022/0408834 A1 Dec. 29, 2022

(30) Foreign Application Priority Data
Jan. 15, 2020 (KR) .................. 10-2020-0005610

(51) Int. Cl.
*A24F 40/51* (2020.01)
*A24F 40/20* (2020.01)
(Continued)

(52) U.S. Cl.
CPC .............. *A24F 40/51* (2020.01); *A24F 40/20* (2020.01); *A24F 40/46* (2020.01); *A24F 40/465* (2020.01);
(Continued)

(58) Field of Classification Search
CPC .......... A24F 40/51; A24F 40/20; A24F 40/46; A24F 40/465; A24F 40/50; A24F 40/53;
(Continued)

(56) References Cited

U.S. PATENT DOCUMENTS

| 11,425,936 B2 | 8/2022 | Otiaba et al. |
| 11,454,996 B2 | 9/2022 | Qiu |

(Continued)

FOREIGN PATENT DOCUMENTS

| CN | 208192124 U | 12/2018 |
| CN | 110582210 A | 12/2019 |

(Continued)

OTHER PUBLICATIONS

International Search Report dated Mar. 24, 2021 from the International Searching Authority in International Application No. PCT/KR2020/018104.

(Continued)

*Primary Examiner* — Justin M Kratt
(74) *Attorney, Agent, or Firm* — Sughrue Mion, PLLC

(57) ABSTRACT

According to one or more embodiments, an aerosol-generating device may be provided, the aerosol-generating device including: a cigarette insertion detection sensor detecting whether a cigarette is inserted into an accommodation space of the aerosol-generating device; a heater heating the cigarette inserted in the accommodation space; at least one temperature sensor measuring temperatures of at least two locations inside the aerosol-generating device; and a controller configured to determine whether the aerosol-gener- (Continued)

ating device is in an overheated state based on temperatures measured by the temperature sensor when the cigarette inserted into the accommodation space is detected by the cigarette insertion detection sensor, and automatically perform a heating operation using the heater after waiting until the overheated state is finished when it is determined that the aerosol-generating device is in an overheated state.

9 Claims, 3 Drawing Sheets

(51) Int. Cl.

| | | |
|---|---|---|
| *A24F 40/46* | (2020.01) | |
| *A24F 40/465* | (2020.01) | |
| *A24F 40/50* | (2020.01) | |
| *A24F 40/53* | (2020.01) | |
| *A24F 40/57* | (2020.01) | |
| *H05B 6/06* | (2006.01) | |
| *H05B 6/10* | (2006.01) | |
| *H05B 6/36* | (2006.01) | |
| *A24F 40/60* | (2020.01) | |
| *H02J 7/00* | (2006.01) | |
| *H02J 50/10* | (2016.01) | |
| *H05B 6/02* | (2006.01) | |

(52) U.S. Cl.
CPC .............. *A24F 40/50* (2020.01); *A24F 40/53* (2020.01); *A24F 40/57* (2020.01); *H05B 6/06* (2013.01); *H05B 6/105* (2013.01); *H05B 6/36* (2013.01); *A24F 40/60* (2020.01); *H01M 2220/30* (2013.01); *H02J 7/0063* (2013.01); *H02J 50/10* (2016.02); *H05B 6/02* (2013.01); *H05B 6/10* (2013.01); *H05B 6/108* (2013.01)

(58) Field of Classification Search
CPC ........... A24F 40/57; A24F 40/60; H05B 6/06; H05B 6/105; H05B 6/36; H05B 6/02; H05B 6/10; H05B 6/108; H01M 2220/30; H02J 7/0063; H02J 50/10
See application file for complete search history.

(56) References Cited

U.S. PATENT DOCUMENTS

| | | |
|---|---|---|
| 2013/0298905 A1 | 11/2013 | Levin et al. |
| 2015/0122274 A1 | 5/2015 | Cohen et al. |
| 2017/0258137 A1 | 9/2017 | Smith et al. |
| 2018/0069272 A1 | 3/2018 | Seo et al. |
| 2020/0037668 A1 | 2/2020 | Robert et al. |
| 2020/0120982 A1 | 4/2020 | Tanabe |
| 2020/0154771 A1 | 5/2020 | Otiaba et al. |
| 2020/0345076 A1 | 11/2020 | Lim et al. |
| 2020/0352231 A1 | 11/2020 | Han et al. |
| 2020/0352247 A1 | 11/2020 | Yamada et al. |
| 2020/0359696 A1 | 11/2020 | Lim |
| 2021/0076745 A1 | 3/2021 | Akao et al. |
| 2021/0251299 A1 | 8/2021 | Seo et al. |
| 2023/0148663 A1 | 5/2023 | Lim |

FOREIGN PATENT DOCUMENTS

| | | | | |
|---|---|---|---|---|
| CN | 110612034 A | 12/2019 | | |
| EP | 0892215 A2 | 1/1999 | | |
| EP | 2468118 A1 | 6/2012 | | |
| EP | 3556230 A2 * | 10/2019 | ............. | A24B 15/16 |
| JP | 2018-505696 A | 3/2018 | | |
| JP | 2019-10038 A | 1/2019 | | |
| KR | 10-2017-0022758 A | 3/2017 | | |
| KR | 10-2018-0129637 A | 12/2018 | | |
| KR | 10-2019-0125979 A | 11/2019 | | |
| KR | 10-2019-0127967 A | 11/2019 | | |
| KR | 10-2019-0129757 A | 11/2019 | | |
| WO | 2018203044 A1 | 11/2018 | | |
| WO | WO-2018203044 A1 * | 11/2018 | ............. | A24F 40/40 |
| WO | 2019/030301 A1 | 2/2019 | | |
| WO | 2019/088589 A2 | 5/2019 | | |
| WO | 2019/138043 A1 | 7/2019 | | |
| WO | 2019/146063 A1 | 8/2019 | | |
| WO | 2019229955 A1 | 12/2019 | | |
| WO | 2020/009412 A1 | 1/2020 | | |
| WO | WO-2020182734 A1 * | 9/2020 | ............. | A24F 40/20 |

OTHER PUBLICATIONS

Communication issued Apr. 27, 2021 by the Korean Patent Office in Application No. 10-2020-0005610.
Office Action dated Jul. 12, 2022 from the Japanese Patent Office in JP Application No. 2021-525801.
Japanese Office Action dated Dec. 13, 2022 in Japanese Application No. 2021-525801.
Office Action dated Apr. 20, 2023 from the Chinese Patent Office in Application No. 202080005381.6.
Communication dated Sep. 13, 2021 from the Korean Intellectual Property Office in Application No. 10-2020-0005610.
Extended European Search Report dated Oct. 1, 2021 from the European Patent Office in Application No. 20855816.3.

* cited by examiner

[Fig. 1]
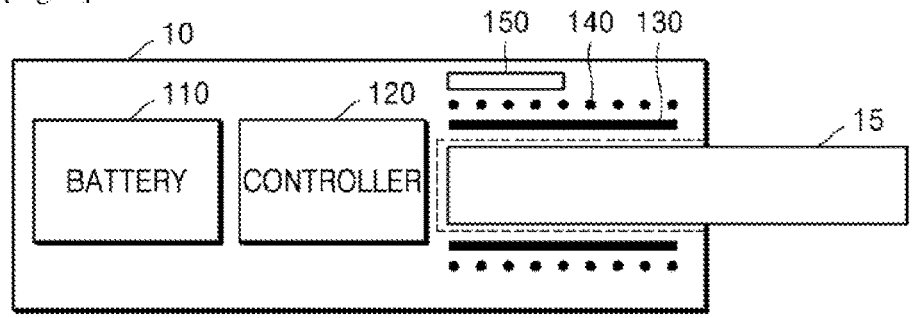
[Fig. 2]
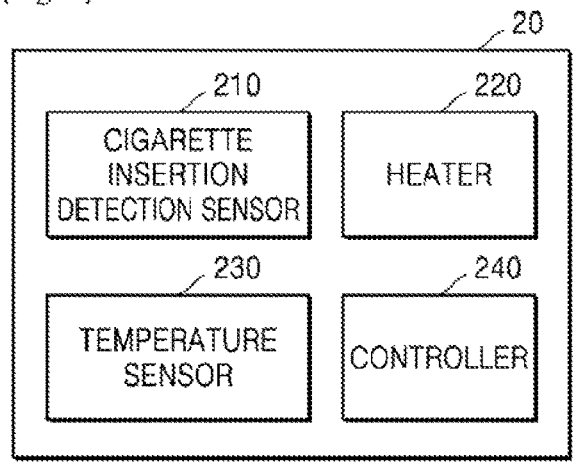
[Fig. 3]
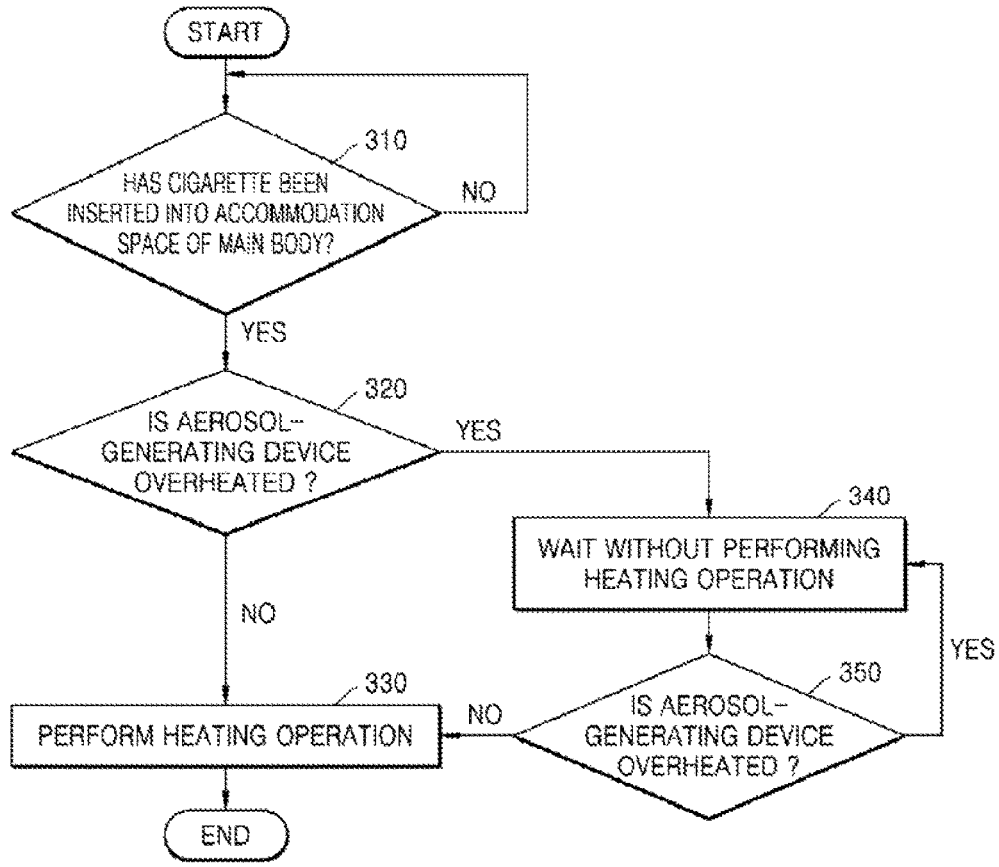

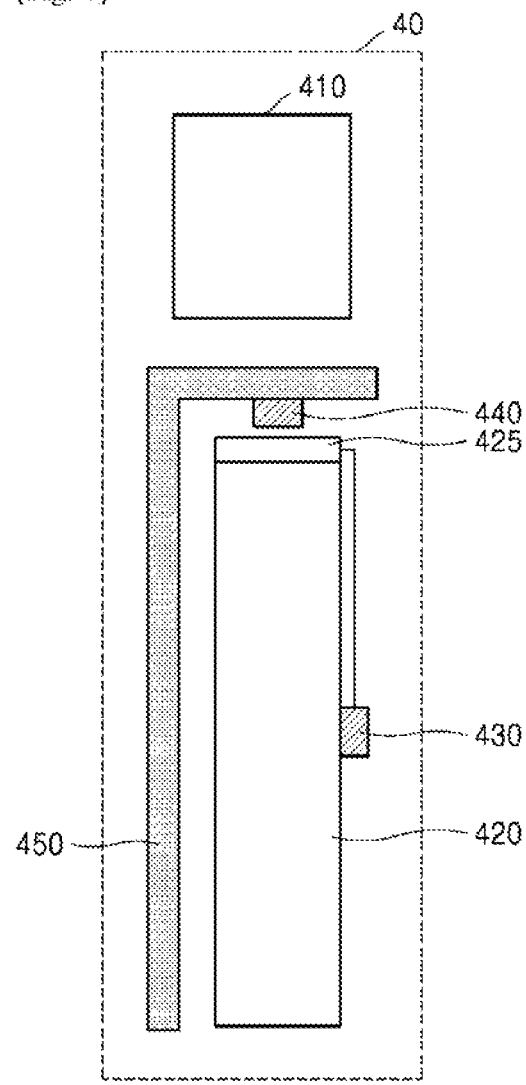
[Fig. 4]

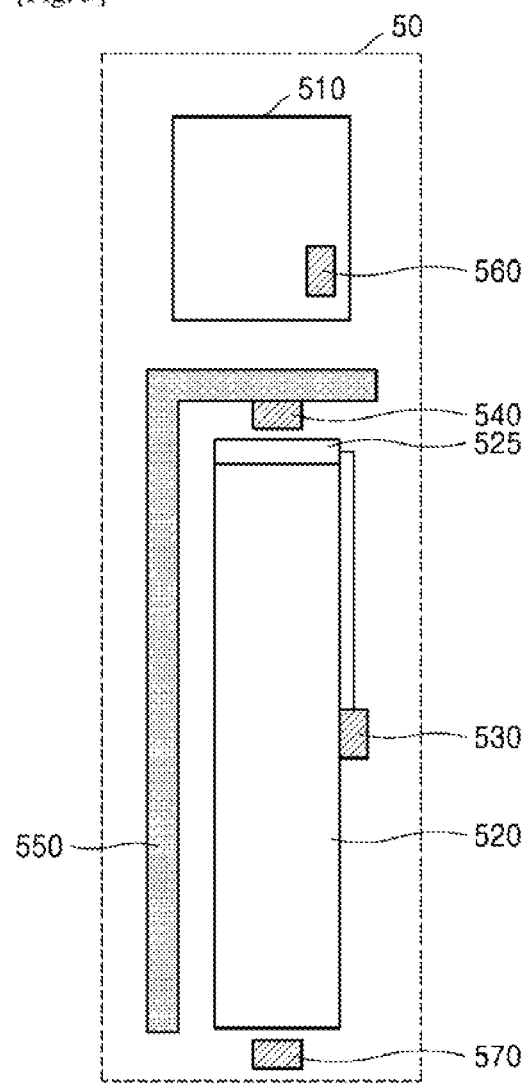

AEROSOL-GENERATING DEVICE AUTOMATICALLY PERFORMING HEATING OPERATION

TECHNICAL FIELD

The present disclosure relates to an aerosol-generating device automatically performing a heating operation.

BACKGROUND ART

Recently, there is an increasing need demand for an alternative to traditional cigarettes. For example, many people use an aerosol-generating device that generates an aerosol by heating an aerosol-generating material, instead of smoking combustive cigarettes.

DISCLOSURE

Technical Problem

When a user continuously smokes a plurality of cigarettes using an aerosol-generating device, the aerosol-generating device may become overheated as the temperature inside the aerosol-generating device is excessively increased. If an additional heating operation is performed even when the aerosol-generating device is overheated, the hardware components inside the aerosol-generating device may be damaged, or safety problems may occur. Therefore, when the aerosol-generating device is in an overheated state, it is necessary to prevent an additional heating operation.

However, in an aerosol-generating device that automatically performs a heating operation without any external input when the insertion of a cigarette is detected, even if the heating operation is prevented because the aerosol-generating device is in an overheated state, it may be difficult for the user to know whether the problem is the cigarette or the aerosol-generating device. Accordingly, the user may mistakenly believe that the heating operation is not performed due to the cigarette problem, and discard a non-defective cigarette. In addition, even if the user is aware that the heating operation is not performed due to the problem with the aerosol-generating device, in order to smoke, a cumbersome action such as extracting the cigarette and then inserting it back into the aerosol-generating device or pressing a button again may be additionally required by the user.

Technical Solution

Various embodiments are solutions for improving the above-described problems, and intended to provide an aerosol-generating device automatically performing a heating operation. The technical solution to be achieved by the present disclosure is not limited to the technical solutions as described above, and other technical solutions may be inferred from the following embodiments.

Advantageous Effects

The present disclosure can provide an aerosol-generating device. In detail, the aerosol-generating device according to the present disclosure determines whether the aerosol-generating device is in an overheated state based on temperatures measured by the temperature sensor when a cigarette is inserted into the accommodation space. In addition, when it is determined that the aerosol-generating device is in an overheated state, the aerosol-generating device may suspend the start of a heating operation, and then automatically perform the heating operation of a heater when the overheated state is finished.

As described above, when it is determined that the aerosol-generating device is in an overheated state, the aerosol-generating device according to the present disclosure may wait until the overheated state is finished, and then automatically perform a heating operation using the heater when the overheated state is finished. Therefore, additional actions for smoking are not required by the user to resume smoking, and user convenience can be increased. In addition, when it is determined that the aerosol-generating device according to the present disclosure is in an overheated state, the aerosol-generating device may display a notification that the heating operation is suspended and will be started after a while. Accordingly, the user may not perform unnecessary actions such as extracting and reinserting the cigarette or pressing a button again to smoke.

In addition, the aerosol-generating device according to the present disclosure may measure temperatures at least two locations inside the aerosol-generating device, and may determine whether the aerosol-generating device is in an overheated state by synthesizing information on the measured temperatures. For example, the aerosol-generating device may determine whether the aerosol-generating device is in an overheated state based on temperatures measured by a first thermistor placed adjacent to the front or rear of a battery and a second thermistor placed between the heater and the battery. Thus, it can be more accurately determined whether the aerosol-producing device is in an overheated state.

DESCRIPTION OF DRAWINGS

FIG. 1 is a diagram illustrating an aerosol generation system according to an embodiment.

FIG. 2 is a block diagram showing the configuration of an aerosol-generating device according to an embodiment.

FIG. 3 is a flowchart illustrating a method of operating an aerosol-generating device according to an embodiment.

FIG. 4 is a diagram illustrating arrangements of temperature sensors according to an embodiment.

FIG. 5 is a diagram illustrating arrangements of temperature sensors according to another embodiment.

BEST MODE

An aerosol-generating device according to an embodiment may include a cigarette insertion detection sensor configured to detect insertion of a cigarette into an accommodation space of the aerosol-generating device; a heater configured to heat the cigarette inserted in the accommodation space; at least one temperature sensor configured to measure temperatures of at least two locations inside the aerosol-generating device; and a controller configured to determine whether the aerosol-generating device is in an overheated state based on the temperatures measured by the at least one temperature sensor when the insertion of the cigarette is detected by the cigarette insertion detection sensor, and control the heater to suspend a heating operation until the overheated state is finished based on the overheated state being detected.

The controller may determine whether the overheated state is finished based on temperatures measured by the temperature sensor, and automatically perform the heating operation even without an external input when it is determined that the overheated state is finished.

The controller may determine that the aerosol-generating device is in the overheated state when the total or weighted total of temperatures measured by the temperature sensor is greater than or equal to a preset threshold.

The controller may automatically perform the heating operation when it is determined that the aerosol-generating device is not in an overheated state.

The controller may output a notification that the heating operation is suspended for a while when it is determined that the aerosol-generating device is in an overheated state.

The aerosol-generating device may further include a battery for supplying power to the heater, and the temperature sensor may include a first thermistor placed adjacent to the front or rear surface of the battery and a second thermistor placed between the heater and the battery.

The temperature sensor may further include at least one of a temperature sensor placed adjacent to the heater and a temperature/humidity sensor placed near a lower surface of the battery.

The cigarette insertion detection sensor may include an inductive sensor configured to detect a change in a magnetic field generated when the cigarette is inserted into the accommodation space, and the heater may include an induction coil configured to generate an alternating magnetic field and a susceptor heated by the alternating magnetic field.

An aerosol-generating device according to another embodiment may include a heater configured to heat a cigarette inserted in an accommodation space of the aerosol-generating device; a battery placed under the heater and configured to supply power to the heater; a first thermistor placed adjacent to a front surface or a rear surface of the battery; a second thermistor placed between the heater and the battery; and a printed circuit board (PCB) configured to determine whether the aerosol-generating device is in an overheated state based on temperatures measured by the first thermistor and the second thermistor, and suspend a heating operation of the heater until the overheated state is finished based on the overheated state being detected.

The first thermistor may be placed adjacent to the center of a front or rear surface of the battery, and be electrically connected to a protection circuit module (PCM) placed on an upper surface of the battery.

At least one portion of the PCB may extend between the heater and the battery, and the second thermistor may be placed adjacent to the at least one portion of the PCB.

An aerosol-generating device according to another embodiment may include a heater configured to heat a cigarette inserted in an accommodation space of the aerosol-generating device; a battery placed under the heater and configured to supply power to the heater; a first thermistor placed adjacent to a front surface or a rear surface of the battery; a second thermistor placed between the heater and the battery; a temperature sensor placed adjacent to the heater; a temperature/humidity sensor placed adjacent to a lower surface of the battery; and a printed circuit board (PCB) configured to: determine whether the aerosol-generating device is in an overheated state based on temperatures measured by at least two of the first thermistor, the second thermistor, the temperature sensor, and the temperature/humidity sensor, and suspend a heating operation of the heater until the overheated state is finished based on the overheated state being detected.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the term "cigarette" may refer to a cigarette-type aerosol-generating article, which contains an aerosol-generating material.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is a diagram illustrating an aerosol generation system according to an embodiment.

Referring to FIG. 1, the aerosol-generating system may include an aerosol-generating device 10 and a cigarette 15. The aerosol-generating device 10 may include an accommodation space into which the cigarette 15 is inserted, and may generate an aerosol by heating the cigarette 15 inserted into the accommodation space. The cigarette 15 is a kind of aerosol-generating article, and may include an aerosol-generating material. In FIG. 1, for convenience of explanation, the aerosol-generating device 10 is shown to be used together with the cigarette 15, but this is only an example. The aerosol-generating device 10 may be used together with any suitable aerosol-generating article other than a cigarette 15.

The aerosol-generating device 10 may include a battery 110, a controller 120, a susceptor 130, an induction coil 140, and a cigarette insertion detection sensor 150. However, the internal structure of the aerosol-generating device 10 is not limited to that shown in FIG. 1. Depending on the design of the aerosol-generating device 10, it may be understood by those of ordinary skill in the art related to the present embodiment that some of components shown in FIG. 1 may be omitted or an additional component may be added.

The battery 110 supplies power used to operate the aerosol-generating device 10. For example, the battery 110 may supply power so that the induction coil 140 may generate an alternating magnetic field. In addition, the battery 110 may supply power required for the operation of other hardware components included in the aerosol-generating device 10, for example, various sensors, a user interface, a memory, and the controller 120. The battery 110 may be a rechargeable battery or a disposable battery. For example, the battery 110 may be a lithium polymer (LiPoly) battery, but is not limited thereto.

The controller 120 is hardware that controls the overall operation of the aerosol-generating device 10. For example, the controller 120 controls the operation of the battery 110, the susceptor 130, the induction coil 140, the cigarette insertion detection sensor 150, and other components included in the aerosol-generating device 10. In addition, the controller 120 may determine whether the aerosol-generating device 10 is in an operable state by checking the states of each of the components of the aerosol-generating device 10.

The controller 120 includes at least one processor. A processor can be implemented as an array of a plurality of logic gates or can be implemented as a combination of a general-purpose microprocessor and a memory in which a program executable in the microprocessor is stored. In addition, it may be understood by those of ordinary skill in the art that the processor may be implemented with other types of hardware.

The susceptor 130 may include a material that is heated when the alternating magnetic field is applied. For example, the susceptor 130 may include metal or carbon. The susceptor 130 may include at least one of ferrite, ferromagnetic alloy, stainless steel, and aluminum (Al). In addition, the susceptor 130 may include at least one of ceramics such as graphite, molybdenum, silicon carbide, niobium, nickel alloy, metal film, zirconia, etc., transition metals such as nickel (Ni) or cobalt (Co), and metalloids such as boron (B) or phosphorus (P). However, it is not limited thereto.

In one example, the susceptor 130 may be tubular or cylindrical, and may be placed to surround the accommodation space into which the cigarette 15 is inserted. When the cigarette 15 is inserted into the accommodation space of the aerosol-generating device 10, the susceptor 130 may be placed to surround the cigarette 15. Therefore, the temperature of the aerosol-generating material in the cigarette 15 may be increased by heat transferred from the external susceptor 130.

The induction coil 140 may generate the alternating magnetic field as power is supplied from the battery 110. The alternating magnetic field generated by the induction coil 140 may be applied to the susceptor 130, and accordingly, the susceptor 130 may be heated. Power supplied to the induction coil 140 may be adjusted under the control of the controller 120, and a temperature at which the susceptor 130 is heated may be properly maintained.

The cigarette insertion detection sensor 150 may detect whether the cigarette 15 is inserted into the accommodation space of the aerosol-generating device 10. In one example, the cigarette 15 may include a metal material such as aluminum, and the cigarette insertion detection sensor 150 may be an inductive sensor that detects a change in the magnetic field generated as the cigarette 15 is inserted into the accommodation space. However, it is not necessarily limited thereto. The cigarette insertion detection sensor 150 may be an optical sensor, a temperature sensor, or a resistance sensor.

When detecting the insertion of the cigarette, the controller 120 may automatically perform a heating operation without an additional external input. For example, the controller 120 may control the battery 110 to supply power to the induction coil 140 when detecting that the cigarette 15 has been inserted by using the cigarette insertion detection sensor 150. As the alternating magnetic field is generated by the induction coil 140, the susceptor 130 may be heated. Accordingly, the cigarette 15 placed inside the susceptor 130 may be heated, and an aerosol may be generated.

The aerosol-generating device 10 may further include general-purpose components in addition to the battery 110, the controller 120, the susceptor 130, the induction coil 140, and the cigarette insertion detection sensor 150. For example, the aerosol-generating device 10 may further include other sensors (e.g., a temperature sensor, a puff sensor, etc.), a user interface, and a memory in addition to the cigarette insertion sensor 150.

The user interface may provide information on the state of the aerosol-generating device 10 to the user. The user interface may include a display or a lamp for outputting visual information, a motor for outputting tactile information, a speaker for outputting sound information, and input/output (I/O) interfacing means (e.g., a button or a touch screen) for receiving information input from the user or outputting information to the user. In addition, the user interface may include various interfacing means such as terminals for performing data communication or receiving charging power and a communication interfacing module for performing wireless communication (e.g., WI-FI, WI-FI Direct, Bluetooth, Bluetooth Low Energy (BLE), Near-Field Communication (NFC), etc.) with an external device.

According to embodiments, the aerosol-generating device 10 may include only some of the various user interface examples illustrated above. Also, the aerosol-generating device 10 may include various combinations of the above-described user interface examples. For example, the aerosol-generating device 10 may include a touch screen display capable of receiving a user input while outputting visual information on the front side. The touch screen display may include a fingerprint sensor, and user authentication may be performed by the fingerprint sensor.

The memory is hardware that stores various types of data processed in the aerosol-generating device 10. The memory may store data processed and data to be processed by the controller 120. The memory may be implemented in various types such as random access memory (RAM) including dynamic random access memory (DRAM) or/and static random access memory (SRAM), read-only memory (ROM), and electrically erasable programmable read-only memory (EEPROM). The memory may store an operation time of the aerosol-generating device 10, a maximum number of puffs, a current number of puffs, at least one temperature profile, and data on a user's smoking pattern.

FIG. 2 is a block diagram showing the configuration of an aerosol-generating device according to an embodiment.

Referring to FIG. 2, an aerosol-generating device 20 may include a cigarette insertion detection sensor 210, a heater 220, a temperature sensor 230, and a controller 240. In the aerosol-generating device 20 shown in FIG. 2, components related to one embodiment are shown. Accordingly, it may be understood by those of ordinary skill in the art related to the present embodiment that other components may be further included in the aerosol-generating device 20 in addition to the components shown in FIG. 2. Meanwhile, the cigarette insertion detection sensor 210 and the controller 240 of FIG. 2 may respectively correspond to the cigarette insertion detection sensor 150 and the controller 120 of FIG. 1. Therefore, redundant descriptions are omitted.

The cigarette insertion detection sensor 210 may detect whether a cigarette is inserted into the accommodation space of the aerosol-generating device 20. In one example, the cigarette insertion detection sensor 210 may include an inductive sensor that detects a change in a magnetic field generated as the cigarette is inserted into the accommodation space. In this case, the cigarette may include a material that may be detected by an inductive sensor, for example, a metal. In addition, the cigarette insertion detection sensor 210 may identify the type of metal included in the cigarette, and may check the genuineness or type of the cigarette based on the identified metal type.

The heater 220 may refer to a hardware configuration for heating the cigarette inserted in the accommodation space of the aerosol-generating device 20. The heater 220 may heat the cigarette using an induction heating method. For example, the heater 220 may include an induction coil for generating an alternating magnetic field and a susceptor heated by the alternating magnetic field. Because the induction coil and the susceptor included in the heater 220 correspond to the susceptor 130 and the induction coil 140 of FIG. 1, respectively, redundant descriptions are omitted.

The temperature sensor 230 may measure temperatures of at least two locations inside the aerosol-generating device 20. For example, the temperature sensor 230 includes a first thermistor placed adjacent to the front or rear of the battery for supplying power to the heater 220 and a second thermistor placed between the heater 220 and the battery. In addition, the temperature sensor 230 may further include at least one of a temperature sensor placed adjacent to the heater 220 and a temperature/humidity sensor placed near a lower surface of the battery. A detailed arrangements of the thermistor or the temperature sensor included in the temperature sensor 230 will be described in more detail below with reference to FIGS. 4 and 5.

When the cigarette inserted into the accommodation space is detected by the cigarette insertion detection sensor 210, the controller 240 may determine whether the aerosol-generating device 20 is in an overheated state based on the temperatures measured by the temperature sensor 230. The overheated state may refer to a state in which hardware components inside the aerosol-generating device 20 are expected to be damaged or a safety problem is expected to occur by an additional heating operation. In one example, when the user continuously smokes a plurality of cigarettes using the aerosol-generating device 20, the aerosol-generating device 20 may become overheated as the temperature inside the aerosol-generating device 20 increases excessively.

The controller 240 may measure temperatures of at least two locations inside the aerosol-generating device 20 using the temperature sensor 230, and determine whether the aerosol-generating device 20 is in an overheated state based on the measured temperatures. Therefore, it may be more accurately determined whether the aerosol-generating device 20 is in an overheated state. There may be various ways in which the controller 240 analyzes the measured temperatures. For example, when the total or weighted total of temperatures measured by the temperature sensor 230 is equal to or greater than a preset threshold, the controller 240 may determine that the aerosol-generating device 20 is in an overheated state. However, the present invention is not limited thereto. As another example, the controller 240 may determine that the aerosol-generating device 20 is in an overheated state when the lowest temperature among the temperatures measured by the temperature sensor 230 is equal to or higher than a preset threshold.

When it is determined that the aerosol-generating device 20 is in an overheated state, the controller 240 may wait until the overheated state is cleared and then automatically perform a heating operation using the heater 220. When it is determined that the aerosol-generating device 20 is in an overheated state, the controller 240 may determine whether the overheated state is cleared based on the temperatures measured by the temperature sensor 230. For example, the controller 240 may continuously monitor the temperatures measured by the temperature sensor 230 at a preset period, and determine whether the overheating condition is finished based on the monitored temperatures.

When it is determined that the overheated state has ended, the controller 240 may automatically perform the heating operation without an external input. In this way, when it is determined that the aerosol-generating device 20 is in an overheated state, the controller 240 may wait until the overheated state is finished, and then automatically start a heating operation using the heater 220 when the overheated state is finished. Therefore, an additional operation for smoking is not required by the user, and user convenience may be increased.

In addition, when it is determined that the controller 240 is in an overheated state, the controller 240 may output a notification that the heating operation is suspended and will be started after a while. Accordingly, the user need not perform unnecessary actions to smoke, such as extracting and reinserting the cigarette or pressing a button again. Meanwhile, the notification may be provided to the user through a touch screen display provided in the aerosol-generating device 20, but is not limited thereto.

In addition, when the overheated state of the aerosol-generating device 20 is finished, the controller 240 may provide a notification to the user that the heating operation is available. In an example, the controller 240 may predict a time taken until the overheated state is finished based on the temperatures measured by the temperature sensor 230 and display the predicted time. When it is determined that the aerosol-generating device 20 is not in an overheated state, the controller 240 may automatically perform a heating operation even if there is no external input.

FIG. 3 is a flowchart illustrating a method of operating an aerosol-generating device according to an embodiment.

Referring to FIG. 3, a method of operating the aerosol-generating device includes steps processed in a time series by the aerosol-generating device 10 or the aerosol-generating device 20 shown in FIGS. 1 and 2. Accordingly, it may be seen that the descriptions given above with respect to the aerosol-generating device 10 or the aerosol-generating device 20 of FIGS. 1 and 2 are also applied to the operating method of the aerosol-generating device of FIG. 3, even though descriptions are omitted below.

In step 310, the aerosol-generating device may determine whether the cigarette is inserted into the accommodation space of a main body. When the aerosol-generating device determines that the cigarette has not been inserted into the accommodation space of the main body, the aerosol-generating device may wait until the cigarette is inserted into the accommodation space of the main body. For example, the aerosol-generating device may repeatedly perform step 310 according to a preset period, and may perform step 310 once based on a change generated due to the insertion of a cigarette. When it is determined that the cigarette is inserted into the accommodation space of the main body, the aerosol-generating device may perform step 320.

In step 320, the aerosol-generating device may determine whether the aerosol-generating device is in an overheated state. When it is determined that the aerosol-generating device is not in an overheated state, the aerosol-generating device may perform step 330. When it is determined that the aerosol-generating device is overheated, the aerosol-generating device may perform step 340.

In step 330, the aerosol-generating device may perform a heating operation. The aerosol-generating device may automatically perform the heating operation even if there is no additional external input.

In step 340, the aerosol-generating device may wait without performing a heating operation. For example, the aerosol-generating device may wait for a heating operation until the overheated state of the aerosol-generating device is finished.

In step 350, the aerosol-generating device may continuously monitor whether the aerosol-generating device is in an overheated state. When it is determined that the aerosol-generating device is still overheated, the aerosol-generating device may continue to wait for a heating operation (step 340). Meanwhile, when it is determined that the overheated state of the aerosol-generating device is finished, the aerosol-generating device may perform a heating operation (step 330).

FIG. 4 is a diagram illustrating arrangements of temperature sensors according to an embodiment.

FIG. 4 schematically shows a cross-sectional view of an aerosol-generating device 40 viewed from the side. In the present embodiment, although it is shown that a heater 410 is placed on the upper side of a battery 420 and the long portion of a PCB 450 is placed to face the front surface of the battery 420, the positional relationship of the components may be different depending on the viewpoint of looking at the aerosol-generating device 40.

Referring to FIG. 4, the aerosol-generating device 40 may include the heater 410, the battery 420, a protection circuit module (PCM) 425, a first thermistor 430, a second thermistor 440, and the printed circuit board (PCB) 450 The aerosol-generating device 40 in FIG. 4 only shows some components particularly related to the present embodiment. Accordingly, it may be understood by those of ordinary skill in the art related to the present embodiment that other components may be further included in the aerosol-generating device 40 in addition to the components shown in FIG. 4.

The heater 410 is a component for heating the cigarette inserted in the accommodation space of the aerosol-generating device 40. Because the heater 410 of FIG. 4 corresponds to the heater 220 of FIG. 2, redundant descriptions are omitted. The heater 410 may include a plurality of hardware components (e.g., a susceptor and an induction coil), although it is illustrated as a single block in FIG. 4 for convenience of description.

The battery 420 supplies power to the heater 410, and may be placed so that the upper surface of the battery 420 faces the lower side of the heater 410. Although not shown in FIG. 4, the battery 420 and the heater 410 may be electrically connected. The battery 420 may be connected to the heater 410 through the PCB 450 or may be directly connected to the heater 410.

The PCM 425 may be placed adjacent to the upper surface of the battery 420. The PCM 425 is a circuit for protecting the battery 420 and may prevent overcharging and over discharging of the battery 420. In addition, the PCM 425 may prevent an overcurrent from flowing through the battery 420 and may cut off electric connections when a short circuit occurs in a circuit connected to the battery 420.

The first thermistor 430 is a resistor having an electrical resistance value that changes sensitively according to a temperature change, and may be used to sense a temperature. The first thermistor 430 may be electrically connected to the PCM 425 placed on the upper surface of the battery 420, and information measured by the first thermistor 430 may be transmitted to the PCB 450 through the PCM 425.

Meanwhile, the first thermistor 430 may be placed adjacent to the front surface or rear surface of the battery 420. For example, as shown in FIG. 4, the first thermistor 430 may be placed adjacent to the rear surface of the battery 420. The first thermistor 430 may be placed adjacent to the center of the front surface or rear surface of the battery 420. The central portion of the front surface or rear surface of the battery 420 corresponds to a portion having the highest temperature in the battery 420, and thus corresponds to a portion that most affects damage or explosion of the battery 420. The aerosol-generating device 40 according to the present disclosure may measure the temperature of a portion that most affects damage or explosion of the battery 420 using the first thermistor 430, and may determine whether the aerosol-generating device 40 is in an overheated state based on the measured temperature.

The second thermistor 440 may be placed between the heater 410 and the battery 420. Because the portion between the heater 410 and the battery 420 corresponds to the portion with the highest temperature in the aerosol-generating device 40, its temperature may be used in determining the overall overheated state of the aerosol-generating device 40. Meanwhile, at least a portion of the PCB 450 extends between the heater 410 and the battery 420, and the second thermistor 440 may be disposed adjacent to the portion of the PCB 450 extending between the heater 410 and the battery 420.

The PCB 450 is a component corresponding to the controller 120 of FIG. 1 or the controller 240 of FIG. 2, and may determine whether the aerosol-generating device 40 is in an overheated state based on the temperatures measured by the first thermistor 430 and the second thermistor 440. When it is determined that the aerosol-generating device 40 is in an overheated state, the PCB 450 may wait until the overheated state is finished and then automatically start a heating operation using the heater 410.

In this way, the aerosol-generating device 40 according to the present disclosure may measure temperatures of at least two locations inside the aerosol-generating device 40, and determine whether the aerosol-generating device 40 is in an overheated state based on the measured temperatures. Accordingly, it may be more accurately determined whether the aerosol-generating device 40 is in an overheated state, and damage to hardware components inside the aerosol-generating device 40 or safety problems may be effectively prevented based on this determination.

FIG. 5 is a diagram illustrating arrangements of temperature sensors according to another embodiment.

Referring to FIG. 5, an aerosol-generating device 50 includes a heater 510, a battery 520, a PCM 525, a first thermistor 530, a second thermistor 540, and may further include a temperature sensor 560 and a temperature/humidity sensor 570. The heater 510, the battery 520, the PCM 525, the first thermistor 530, the second thermistor 540 and the PCB 550 of FIG. 5 correspond to the heater 410 and the battery 420, the PCM 425, the first thermistor 430, the second thermistor 440, and the PCB 450 of FIG. 4, respectively. Therefore, redundant descriptions are omitted.

The temperature sensor 560 may be placed adjacent to the heater 510 to directly or indirectly measure the temperature of the heater 510. The heater 510 is a part that most affects the cigarette inserted in the aerosol-generating device 50, and the characteristics of the aerosol generated by the cigarette may be changed depending on the temperature of the heater 510. The aerosol-generating device 50 according to the present embodiment may determine whether the aerosol-generating device 50 is in an overheated state based on the temperature of the heater 510 measured using the temperature sensor 560. In an embodiment, the aerosol-generating device 50 may determine that it is in an overheated state if damage to the aerosol-generating device 50 is not expected but degradation of the characteristics of the aerosol generated from the cigarette is expected by additional heating operation.

The temperature/humidity sensor 570 may be placed near the lower surface of the battery 520 to measure temperature or humidity. The vicinity of the lower surface of the battery 520 is an area that is least affected by the heater 510, and may correspond to an area in which the temperature of the housing constituting the exterior of the aerosol-generating device 50 is reflected. The aerosol-generating device 50 according to the present embodiment may determine whether the aerosol-generating device 50 is in an overheated state based on a temperature near the lower surface of the battery 520 measured using the temperature/humidity sensor 570. Accordingly, the aerosol-generating device 50 may determine that it is in an overheated state if the temperature of the housing of the aerosol-generating device 50 is excessively high.

The PCB 550 may determine whether the aerosol-generating device 50 is in an overheated state based on the temperatures measured by at least two of the first thermistor 530, the second thermistor 540, the temperature sensor 560, and the temperature/humidity sensor 570. As described above, the aerosol-generating device 50 according to the present disclosure may determine an overheated state by comprehensively considering the possibility of damage to hardware components inside the aerosol-generating device 50, characteristics of the aerosol generated from the cigarette, the possibility of occurrence of safety problems due to heat transferred to the housing, and the like, and accordingly, the aerosol-generating device 50 may be maintained in an optimal state.

At least one of the components, elements, modules or units (collectively "components" in this paragraph) represented by a block in the drawings may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

One embodiment may also be implemented in the form of a recording medium including instructions executable by a computer, such as a program module executable by the computer. A computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and non-volatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media. The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. An aerosol-generating device comprising:
 a cigarette insertion detection sensor configured to detect insertion of a cigarette into an accommodation space of the aerosol-generating device;
 a heater configured to heat the cigarette inserted in the accommodation space;
 at least one temperature sensor configured to measure temperatures of at least two locations inside the aerosol-generating device, wherein the at least one temperature sensor includes at least two of a first thermistor placed adjacent to a front surface or a rear surface of battery configured to supply power to the heater, a second thermistor placed between the heater and the battery, or a temperature/humidity sensor placed near a lower surface of the battery; and
 a controller configured to determine whether the aerosol-generating device is in an overheated state based on the temperatures measured by the at least two of the first thermistor, the second thermistor, and the temperature/humidity sensor when the insertion of the cigarette is detected by the cigarette insertion detection sensor, and control the heater to suspend a heating operation until the overheated state is finished based on the overheated state being detected.

2. The aerosol-generating device of claim 1, wherein the controller is configured to determine whether the overheated state is finished based on new temperatures measured by the at least one temperature sensor, and automatically perform the heating operation when the overheated state is finished.

3. The aerosol-generating device of claim 1, wherein the controller is configured to determine that the aerosol-generating device is in the overheated state based on whether a total or a weighted total of the temperatures measured by the at least one temperature sensor is greater than or equal to a preset threshold.

4. The aerosol-generating device of claim 1, wherein the controller is configured to automatically perform the heating operation when it is determined that the aerosol-generating device is not in the overheated state.

5. The aerosol-generating device of claim 1, wherein the controller is configured to output a notification that the heating operation is suspended for a while based on the overheated state being detected.

6. The aerosol-generating device of claim 1, wherein
the cigarette insertion detection sensor includes an inductive sensor configured to detect a change in a magnetic field generated when the cigarette is inserted into the accommodation space, and
the heater includes an induction coil configured to generate an alternating magnetic field and a susceptor heated by the alternating magnetic field.

7. An aerosol-generating device comprising:
a heater configured to heat a cigarette inserted in an accommodation space of the aerosol-generating device;
a battery placed under the heater and configured to supply power to the heater;
a first thermistor placed adjacent to a front surface or a rear surface of the battery;
a second thermistor placed between the heater and the battery; and
a printed circuit board (PCB) configured to determine whether the aerosol-generating device is in an overheated state based on temperatures measured by the first thermistor and the second thermistor, and suspend a heating operation of the heater until the overheated state is finished based on the overheated state being detected, wherein
at least one portion of the PCB extends between the heater and the battery, and
the second thermistor is placed adjacent to the at least one portion of the PCB.

8. The aerosol-generating device of claim 7, wherein the first thermistor is placed adjacent to a center of the front surface or the rear surface of the battery, and is electrically connected to a protection circuit module (PCM) placed on an upper surface of the battery.

9. An aerosol-generating device comprising:
a heater configured to heat a cigarette inserted in an accommodation space of the aerosol-generating device;
a battery placed under the heater and configured to supply power to the heater;
a first thermistor placed adjacent to a front surface or a rear surface of the battery;
a second thermistor placed between the heater and the battery;
a temperature sensor placed adjacent to the heater;
a temperature/humidity sensor placed adjacent to a lower surface of the battery; and
a printed circuit board (PCB) configured to:
determine whether the aerosol-generating device is in an overheated state based on temperatures measured by at least two of the first thermistor, the second thermistor, the temperature sensor, and the temperature/humidity sensor, and
suspend a heating operation of the heater until the overheated state is finished based on the overheated state being detected.

* * * * *